Figure 1:
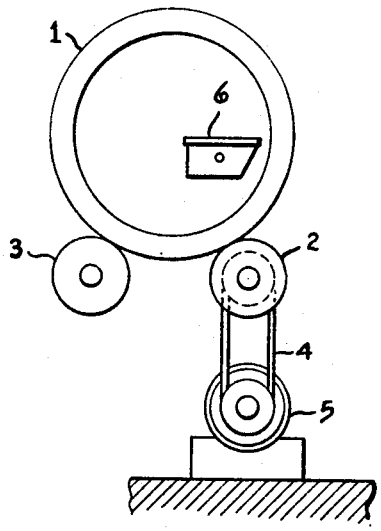

Nov. 29, 1966   R. T. HUCKS, JR   3,288,171
FLUID CONDUIT AND METHOD FOR MAKING SAME
Original Filed Sept. 29, 1961

COATING

INVENTOR.
ROBERT T. HUCKS JR
BY
John L. McKinney
ATTORNEY

United States Patent Office

3,288,171
Patented Nov. 29, 1966

3,288,171
FLUID CONDUIT AND METHOD
FOR MAKING SAME
Robert T. Hucks, Jr., Somerville, N.J., assignor to Johns-Manville Corporation, New York, N.Y., a corporation of New York
Original application Sept. 29, 1961, Ser. No. 141,849, now Patent No. 3,219,472, dated Nov. 23, 1965. Divided and this application Feb. 10, 1965, Ser. No. 431,635
4 Claims. (Cl. 138—145)

This application is a division of application Serial No. 141,849, filed September 29, 1961, now U.S. Patent No. 3,219,472, which application is a continuation-in-part of application Serial No. 756,638, filed August 22, 1958 and now abandoned.

The present invention relates to fluid conduit, such as pipe, provided with a coating on its interior surface, and to a method for producing such conduit. The invention is concerned with porous pipe such as fibro-cement pipe and with coatings which, although applied in a hot liquid form, may be cured to a solid fluid-impervious state. The method of the invention, while useful in providing substantially any type of porous pipe with any type of coating which is applied in hot liquid form and is then cured to a solid fluid-impervious state, is particularly useful in producing fluid conduit comprising fibro-cement pipe having on its interior surface a cast coating including a filler material and a particular type of thermosetting resin.

It has long been recognized as desirable, in the adaptation of porous pipe for use as fluid conduit, to provide the pipe with an interior coating which will be smooth, hard, fluid-impervious and chemical-resistant and which will be firmly bonded to the pipe, but great difficulty has been experienced in actually attaining the desired degree of fluid-imperviousness in the coating and the desired firmness of bond of the coating to the pipe by any method which is economically feasible when the pipe is composed of fiber and cement. Perhaps the most convenient general method of applying a coating to the interior of a fibro-cement pipe is by what will here be termed as "casting," i.e., by distributing the coating in liquid form onto the interior surface of the pipe and spinning the pipe about its axis to cast the liquid centrifugally into a layer of substantially uniform thickness with portions thereof penetrating the pores of the pipe. Casting methods which have previously been used for coating cementitious pipe, however, either are economically unsuited for coating fibro-cement pipe or produce coatings which either are not completely bonded to the pipe or include such a large number of minute holes (termed "pin holes") as to be somewhat pervious to fluids.

One prior casting method employed in coating cementitious pipe is disclosed in U.S. Patent No. 2,962,052 and involves casting on the interior of a concrete pipe a liquid coating composition comprising a polyester resin and a filler, both the coating composition and the pipe being at ambient temperatures and the coating being air cured to a solid state. This method has been found unsatisfactory for coating fibro-cement pipe because with both the coating composition and pipe at ambient temperatures there not only is insufficient penetration of the coating into the pores of the pipe to bond the coating firmly to the pipe but also there is such a relatively long period required for air cure that the process is economically unfeasible. In a second prior casting method, the coating composition is relatively hot while the pipe is either at ambient temperatures or is heated at its exterior surface. This second method, at least when applied to fibro-cement pipe, has been found to result in an excessive number of pin holes and/or blisters so that it has been found difficult or impossible to secure an interior coating on the pipe which is smooth, fluid-impervious and firmly bonded to the pipe.

One object of the present invention is to provide a fluid conduit comprising a smooth, hard, blister-free, fluid impervious chemical-resistant coating firmly bonded to the interior surface of a fibro-cement pipe.

Another object of the present invention is to provide a method of coating the interior surface of a fibro-cement pipe which method is economically feasible and results in a coating which is firmly bonded and free of pin holes and blisters.

In brief, the above objects are attained in the present invention by casting a heated liquid coating on the interior surface of a fibro-cement pipe which has been heated prior to casting to approximately the same temperature as the heated coating but which pipe, during casting, is in a state of cooling from the outside so that its exterior surface is significantly lower in temperature than the interior surface. This method of coating, while useful with many coating materials to prevent blisters and pin holes and to secure a firmly bonded smooth coating, is particularly useful with heat reactable coating materials comprising catalyzed thermosetting resins such as epoxy, polyester and polyurethane resins which produce hard, chemical-resistant coatings. It is believed that the method of the present invention attains the desired result by carrying heat away from the interior surface of the pipe through the pipe wall during casting, thereby eliminating the formation and/or further expansion of gases or vapor in the pores of the pipe at the interior surface after the casting process has begun, such formation and/or expansion possibly having been the cause of the blisters and pin holes which resulted from prior methods of applying hot liquid coating materials to the interior surface of the pipe. The method is therefore particularly useful where there is an exothermic reaction in the coating during casting.

Figure 2:
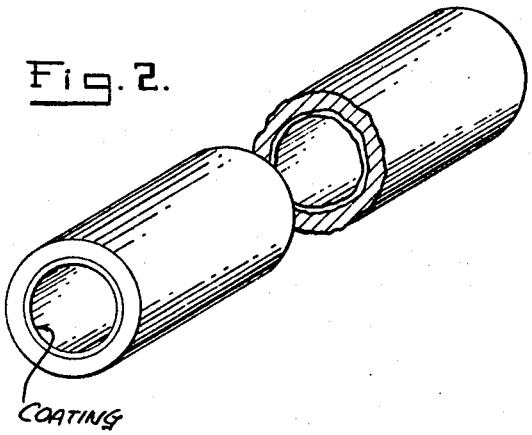

The invention will be more fully understood and further objects and advantages thereof will become apparent when reference is made to the following detailed description of a preferred embodiment of the invention and the accompanying drawings in which:

FIG. 1 is an end elevation of apparatus suitable for carrying out the method of the invention; and FIG. 2 is a pictorial representation of a coated pipe.

Referring to the drawing there is disclosed in FIG. 1 apparatus adapted to perform the method of the instant invention so as to provide a fluid conduit comprising a porous fibro-cement pipe having on the interior surface thereof a cast, hardened, smooth, blister-free and fluid-impervious coating. A fibro-cement pipe 1 is supported on rollers 2 and 3 for rotation thereon. The roller 2 is supported in the position shown for rotation in suitably mounted conventional journal boxes (not shown) and is rotated by a conventional driving belt 4 which is connected to a suitable source of power 5, such as a variable speed motor. The arrangement is such that the speed of rotation of the roller 2 can be varied selectively and controlled as desired. The roller 3 is journalled for rotation in suitably supported conventional journal boxes (not shown) which are mounted for adjustment in a horizontal plane. The adjustment of the roller 3 allows the apparatus to accommodate different sizes of fibro-cement pipe for rotation on the rollers 2 and 3. A suitable mechanism 6 applies the heated liquid resin coating material to the inner surface of the fibro-cement pipe in a conventional manner.

In accordance with the method of the instant invention, a fibro-cement pipe is heated to a predetermined temperature approximating that of the liquid resin coating material and then placed on the rollers 2 and 3. The fibro-cement pipe is rotated at a predetermined speed by the roller 2 driven by the power source 5. During rotation of the fibro-cement pipe and while it is in a state of cooling primarily at its exterior surface, a heated liquid resin coating material is applied to the inner surface of the pipe through the mechanism 6. The heated liquid resin coating material is applied in sufficient quantity that a coating of desired thickness will be formed on the inner surface of the fibro-cement pipe. The rotation of the fibro-cement pipe is continued until the heated liquid resin coating material has solidified or set up to the point of resisting flow or slumping. It is necessary that the speed of rotation of the fibro-cement pipe be sufficiently high that any ripples in the resin coating will be removed and that the coating material will be held on the pipe wall. The peripheral speed of the pipe preferably is from 100 to 360 feet per minute. After the coating material has solidified or set up to the point of resisting flow or slumping, the pipe is removed from the rotating means and the coating is allowed to continue curing in a conventional manner. The resulting product, as shown in FIG. 2, comprises a fibro-cement pipe having on the interior surface thereof a cast, hardened, smooth, blister-free, fluid-impervious coating, so that the fibro-cement pipe may be used in situations or services requiring fluid imperviousness and a smooth surface over which the flow of the fluid to be transmitted through the pipe is directed. The fibro-cement pipe may also be used in situations or services requiring high chemical resistance to fluids to be carried by the pipe by selection of coating material which will exhibit that property after the completion of the process in the resulting product.

In practicing the method of the instant invention, there are certain procedures that should be followed. The fibro-cement pipe mass is preheated to a temperature which is approximately the same as the application temperature of the resin coating material. The application temperature level of the liquid resin coating material, and in turn of the pipe mass, is dictated primarily by the curing and handleability or application characteristics of the particular resin coating material. Temperatures for curing and application conditions, e.g., providing manageable viscosities, for the foregoing identified resinous materials suitably filled to control subsequent shrinkage, comprise a range of from about 125° up to about 375° F. The heated, liquid coating material is distributed over the inner surface of the heated pipe by any suitable means such as by spraying, etc. During the application of the hot liquid coating material, the pipe is in rotation, so as to cast the hot liquid coating material into a continuous layer of substantially uniform thickness coterminous with the interior surface of the pipe. The centrifugal forces established by the rotation of the pipe and the viscosity of the hot liquid coating material cooperate to effect substantial penetration of the hot liquid coating material into the pores adjacent the interior surface of the pipe to form an integral bond therewith. The rotation of the coated pipe is continued until the liquid coating material solidifies or sets up to the point of resisting flow or slumping.

During the application of the hot liquid coating material to the interior surface of the rotating fibro-cement pipe and during curing of the coating material on the interior surface of the rotating pipe until the coating material solidifies or sets up to the point of resisting flow or slumping, certain temperature conditions should prevail so that a blister-free and fluid-impervious coating is provided. At the time of application the temperature of the liquid coating material should be approximately the same as the temperature of the inner surface of the pipe and the inner surface of the pipe should be at a higher temperature than the exterior surface so that a generally descending temperature gradient exists between the two surfaces. The required temperature gradient seems to exist naturally, for example, when a heated standard 6-inch asbestos-cement pipe is rotated at about 120 r.p.m. For large size asbestos-cement pipe, such as 36-inch pipe, it may be necessary to cool the exterior surface in order to secure the desired generally descending temperature gradient. If the hot liquid coating material is either appreciably hotter or cooler than the interior surface of the pipe, or if the generally descending temperature gradient is not maintained, blow holes result to mar the surface and usefulness of the resin coating for the fibro-cement pipe. However, small deviations in the temperature of the coating materials are permissible since the relative wall thickness of the coating material is small as compared to that of the pipe and the temperature of the coating material will rapidly conform to the temperature of the interior surface of the pipe.

Under the foregoing operating conditions, the fibro-cement pipe is in a state of cooling during the coating operation so that the temperature of the inner surface of the fibro-cement pipe is falling and thus causing a contraction of gases or vapor in the pores of the pipe. The temperature of the coating material must be such that this condition is not destroyed and a slight vacuum prevails in the walls of the fibro-cement pipe as the coating is applied. This vacuum cooperates with the centrifugal forces due to the rotation of the fibro-cement pipe and the viscosity of the hot liquid coating material to effect maximum penetration of the hot liquid coating material into the pores of the fibro-cement pipe adjacent the interior surface thereof to form an integral association and intimate bonding of the resin coating material and the fibro-cement pipe.

If the asbestos-cement pipe is heated during the coating operation or the curing of the liquid resin coating material, blow holes are produced in the coating. When heat is applied to the exterior of the fibro-cement pipe during the coating operation, the desired temperature gradient is reversed with the greater temperatures occurring at the outer surface of the fibro-cement pipe. This forces the gases and/or vapor toward the coating to form blow holes therein. Thus, as indicated in the explanations above, it is essential to maintain a temperature gradient in the fibro-cement pipe wherein the greater temperature is at the inner surface of the fibro-cement pipe during the application and curing of the coating material.

Suitable coating materials for use in accordance with the instant invention comprise liquid resin compositions (as opposed to solvent dispersed solid resin sytems) which are curable to an infusible, durable, chemical-resistant resin. Preferred materials consist of those resin materials which exhibit an affinity for and/or tolerate asbestos-hydraulic cement compositions and which are easily converted upon application from a liquid to solid state and cured by appropriate catalysts and elevated temperatures. Effective catalyst and/or reaction accelerating heat conditions may be in accordance with those provided by the resin vendor or as prescribed by the knowledge of the art. When employed in connection with epoxy and the like resin the term catalyst is to be understood as embracing the conventional hardening agents normally utilized therewith. Examples of the preferred class of coating materials include catalyzed thermosetting epoxy, polyester, and polyurethane resins. These resins are not detrimentally affected by the alkali conditions normally found in calcareous cementitious materials and provide liquid coating materials of handleable viscosities at relatively low temperature even when filled, and may be economically applied and cured under industrially feasible conditions by heat reacting at temperatures between about 125° F. and about 350° F., and, when cured, provide particularly durable coatings resistant to the acid conditions frequently found in sewerage and industrial applications. Liquid coatings in thicknesses of from 8–60 mils, prepared and/or applied to the pipe in accordance with the foregoing prescribed conditions, may be heat and catalyst reacted in situ to a degree of solidification effectively resisting flow or slumping within about 3 to 6 minutes with the cure being completed in an overall period of about 5 to 20 minutes from application at the relatively low temperature of approximately 125–350° F.

To offset any shrinkage normally encountered during the curing of thermosetting resins, and, in turn, depending upon the circumferential area of the coating, i.e., diameter of the pipe coated, the resin should be filled with finely divided, chemically resistant or substantially inert particulate material such as sand, ground glass and the like in amounts of up to approximately 60% by weight of the coating composition. Fillers in proportion of about 20–60% by weight of the composition have been found effective in controlling the shrinkage encountered with typical thermosetting resin coatings in average size fibro-cement pipe.

The examples below illustrate the improved method of applying the chemical-resistant, fluid-impervious coatings to the interior surface of fibro-cement pipe and the coated products thereof. It is to be understood that the compositions of the particular resin coatings and the relative proportions of the constituents thereof set forth in these examples are all exemplary and are not to be construed as limiting the novel method or means of this invention to any specific compositions recited in these examples.

In each of the following examples, the fibro-cement pipes employed had a 6-inch inside diameter with a wall thickness of ⅝-inch and the rate of rotation of the pipe throughout each procedure was approximately 120 revolutions per minute. Also, percentages and/or parts ratios given in these examples are all based upon weight. The coating produced in each of the examples was well bonded, smooth and ripple free throughout the interior surface of the pipe.

Example 1

A liquid coating material, comprising 60% by weight of bisphenol A-epichlorohydrin resin (Epon 828, Shell Chemical Corporation) and 40% by weight of a finely divided silica, is combined with a silicone resin flow control agent (SR–82, General Electric Co.) in an amount by weight of 1 part of the silicone resin flow control agent per 100 parts of the epoxy resin and with a triethylenetetramine curing agent in an amount by weight of 12 parts of the triethylenetetramine curing agent per 100 parts of the epoxy resin at a temperature of 230° F., was spray-applied over the interior surface of asbestos-cement pipe sections previously heated to a temperature of 220° F. The amount applied was sufficient to provide a substantially uniform coating of about 20 mils in thickness. Rotation of each pipe was continued for a period of approximately 6 minutes from time of application whereupon the resin coating had solidified to the point of resisting flow or slumping and the cure of the hot resin coating was complete within about 10 minutes from the time of application.

Examples 2 and 3

A liquid epoxy based resin coating formulation of 40% by weight of bisphenol A-epichlorohydrin resin and 60% by weight of finely divided silica filter is combined with a silicone resin flow control agent (SR–82, General Electric Co.) in an amount by weight of 1 part of the silicone resin flow control agent per 100 parts of the epoxy resin and with a triethylenetetramine curing agent in an amount by weight of 12 parts of the triethylenetetramine curing agent per 100 parts of the epoxy resin maintained at a temperature of 240° F. was uniformly sprayed throughout the interior of rotating sections of fibro-cement pipe heated to 240° F. in amounts to provide coating linings within sections of pipe of either 20 mils or 40 mils in thickness. In the 20-mil thick coated pipe sections, the catalyzed heat reaction had proceeded to the point of permitting termination of the rotation at approximately 4 minutes following application with a complete cure being effected within about 8 minutes from application, and the reaction in the 40-mil thick coated pipe products proceeded sufficiently rapidly to permit termination of rotation within about 3 minutes following application with completion of the cure about 6 minutes after application.

Example 4

A liquid coating formulation of 60% by weight of isophthalic polyester (Aropol Q 6015, Archer, Daniels, Midland Company) and 40% of finely divided silica filler mixed with methylethylketone peroxide catalyst in proportions of 1 part per 100 parts of the polyester resin was applied, while at a temperature of 125° F., to a thickness of 20 mils throughout the interior of rotating sections of asbestos-cement pipe heated to 125° F. The polyester base coatings advanced to a state of cure permitting termination of rotation of each pipe section at approximately 5 minutes after application, and cure thereof was completed in 15 minutes from application.

Example 5

A liquid elastomer, comprising a polyether based urethane elastomer (Adiprene L167, Du Pont) in amount of 83.3% by weight and 4,4'-methylene-bis (2-chloroaniline) (MOCA, Du Pont) in an amount of 16.7% at 220° F. was applied as a 20-mil thick coating to rotating fibro-cement pipe sections also heated to 220° F., permitting termination of rotation at approximately 3 minutes after application with deformation, and the cure thereof was complete at about 5 minutes from application.

Example 6

A liquid epoxy coating composition at a temperature of 240° F. and composed of 60% by weight of bisphenol A-epichlorohydrin with 40% by weight of powdered silica filler combined with a triethylenetetramine curing agent in a ratio of 12 parts per 100 parts of the epoxy resin was distributed over the inner surface of asbestos-cement pipe to a thickness of 40 mils. The temperature of the liquid coating composition at application was 240° F. whereas the temperature of the rotating pipe was 250° F. The catalyst-activated and heat-accelerated cure progressed to the point of permitting termination of rotation of the pipe within approximately 5 minutes and the pipe was then post cured in an oven for 2 hours at 250° F.

As shown by the above examples a difference of 10° F. between the temperature of the coating material at the time of application and the temperature of the interior surface of the pipe can readily be tolerated. It is believed that satisfactory results may be obtained, and that these two temperatures may be considered to be approximately the same, or not appreciably different, when the actual difference is as high as about 20° F., but the greater this temperature difference the greater this risk that pin holes and blisters will develop, and it is preferable to maintain this difference as low as possible.

When applying a hot liquid resin coating material to a relatively large-diameter and thick-walled fibro-cement pipe, such as an 18-inch Class 200 asbestos-cement pipe having a wall thickness of approximately 2.17 inches, in accordance with the method of the instant invention, it is sometimes necessary to apply distinct and additional cooling means to the exterior surface of the fibro-cement pipe so that the proper temperature gradient, as described above, exists in the pipe. One such cooling means comprises a water spray positioned to distribute cooling water to the exterior surface of the rotating pipe during the coating and initial curing operation. Any other desired type of cooling means may be applied to the exterior surface of the pipe to insure that the temperature gradient, as explained above, exists in the pipe and that the temperature adjacent the interior surface of the pipe is not substantially increased after the application of the hot liquid resin coating material.

In those instances wherein the method of the instant invention is practiced at temperatures exceeding 212° F., it is desirable to remove moisture from the fibro-cement pipe prior to the coating operation. When coating 6-inch Class 150 asbestos-cement pipe, the uncoated pipe is placed in an oven and maintained at 240° F. for sixteen hours. If the excessive moisture is not removed from the pipe, the continuing generation of steam within the walls of the pipe tends to cause the formation of blowholes or other imperfections in the coating whereby there does not result the formation of a smooth, continuous, uniform, blister-free and fluid-impervious coating on the interior surface of the pipe. In those instances where the method of the instant invention is practiced at temperatures less than 212° F., it is not necessary to remove the moisture from the pipe.

As stated in the foregoing description, the instant invention is useful in the coating of porous fluid conduit such as fibro-cement pipe, and especially asbestos-cement pipe, which is well known and extensively used commercially. Such asbestos-cement pipe typically comprises asbestos fibers and a binder comprising hydrated, hardened hydraulic setting (Portland) cement. The invention is particularly applicable to such asbestos-cement fluid conduit in its cured state, in which the cement is hardened or set to a shape-retaining condition, prior to the coating operations, but it is recognized that "green" or uncured asbestos-cement fluid conduit could be coated by applying the concepts of the invention.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A fluid conduit comprising:
  (a) a porous fibro-cement pipe having on the interior surface thereof a cast, hardened, smooth, blister-free, and fluid-impervious coating,
  (b) said coating penetrating pores of said interior surface to form an integral bond therewith,
  (c) said coating comprising a heat-reacted, catalyzed, liquid, thermosetting resin, and
  (d) said coating being between about 8 and about 60 mils in thickness.
2. The coated fluid conduit of claim 1 wherein the coating comprises catalyzed thermosetting resin selected from the group consisting of epoxy, polyester and urethane resin.
3. A fluid conduit comprising:
  (a) a porous fibro-cement pipe having on the interior surface thereof a cast, hardened, smooth, blister-free, and fluid impervious coating,
  (b) said coating penetrating pores of said interior surface to form an integral bond therewith,
  (c) said coating comprising a heat-reacted, catalyzed, liquid, thermosetting resin and filler,
  (d) said filler being between about 20 to about 50 percent by weight of the total composition of said resin and said filler, and
  (e) said coating being between about 8 and about 60 mils in thickness.
4. The coated fluid conduit of claim 3 wherein the coating comprises an epoxy resin.

References Cited by the Examiner

UNITED STATES PATENTS

| | | | |
|---|---|---|---|
| 1,618,540 | 2/1927 | Ligonnet | 117—95 X |
| 2,109,644 | 3/1938 | Klingensmith | 117—101 X |
| 2,824,078 | 2/1958 | Mellick | 117—161 X |
| 2,962,052 | 11/1960 | Sergovic | 138—145 |

FOREIGN PATENTS 521,902  6/1940  Great Britain.

LAVERNE D. GEGIER, *Primary Examiner.*

C. HOUCK, *Assistant Examiner.*